(12) United States Patent
Lee

(10) Patent No.: US 11,345,260 B2
(45) Date of Patent: May 31, 2022

(54) SEAT PUMPING DEVICE FOR VEHICLE

(71) Applicant: HYUNDAI TRANSYS INCORPORATED, Seosan-si (KR)

(72) Inventor: Young Sun Lee, Seoul (KR)

(73) Assignee: HYUNDAI TRANSYS INCORPORATED, Seosan-si (KR)

( * ) Notice: Subject to any disclaimer, the term of this patent is extended or adjusted under 35 U.S.C. 154(b) by 130 days.

(21) Appl. No.: 16/881,679

(22) Filed: May 22, 2020

(65) Prior Publication Data

US 2020/0398707 A1    Dec. 24, 2020

(30) Foreign Application Priority Data

Jun. 19, 2019  (KR) .................... 10-2019-0072998

(51) Int. Cl.
*B60N 2/16*      (2006.01)
*F16H 21/40*   (2006.01)

(52) U.S. Cl.
CPC ............. *B60N 2/167* (2013.01); *F16H 21/40* (2013.01)

(58) Field of Classification Search
CPC ................................ B60N 2/167; F16H 21/40
See application file for complete search history.

(56) References Cited

U.S. PATENT DOCUMENTS

| 2017/0096083 A1* | 4/2017 | Lee ......................... B60N 2/167 |
| 2018/0099585 A1* | 4/2018 | Mikasa ................. B60N 2/1615 |
| 2019/0193599 A1* | 6/2019 | Kim ......................... B60N 2/167 |
| 2020/0096057 A1* | 3/2020 | Mikasa ................. B60N 2/1615 |
| 2020/0391639 A1* | 12/2020 | Lee ......................... B60N 2/1635 |
| 2021/0123491 A1* | 4/2021 | Lee .......................... F16D 67/02 |

FOREIGN PATENT DOCUMENTS

| KR | 10-0722849 B1 | 5/2007 |
| KR | 10-0784620 B1 | 12/2007 |
| KR | 10-2013-0024528 A | 3/2013 |
| KR | 10-2016-0035207 A | 3/2016 |
| KR | 10-1774341 B1 | 9/2017 |
| WO | 2014/084652 A1 | 6/2014 |
| WO | 2017/111414 A1 | 6/2017 |

* cited by examiner

*Primary Examiner* — Terence Boes
(74) *Attorney, Agent, or Firm* — Novick, Kim & Lee, PLLC; Jae Youn Kim

(57) ABSTRACT

A seat pumping device for a vehicle is mounted to a vehicle seat frame at a lower end part thereof, and may include: a housing having inner space provided therein and a slit hole provided in an upper end surface thereof; a clutch cam rotatably received into the inner space of the housing and having protrusions provided thereon, the protrusions protruding toward an outside of the housing by passing through the slit hole of the upper end surface thereof; and a lever bracket arranged at the outside of the housing to face the upper end surface of the housing, and having an insertion portion into which each of the protrusions of the clutch cam is inserted, so that the lever bracket is coupled to the clutch cam by coupling of the protrusion and the insertion portion to each other, and is rotated with the clutch cam.

8 Claims, 8 Drawing Sheets

# SEAT PUMPING DEVICE FOR VEHICLE

CROSS REFERENCE TO RELATED APPLICATION

The present application claims priority to Korean Patent Application No. 10-2019-0072998, filed Jun. 19, 2019, the entire contents of which is incorporated herein for all purposes by this reference.

BACKGROUND OF THE INVENTION

Field of the Invention

The present invention generally relates to a seat pumping device for a vehicle. More particularly, the present invention relates to a seat pumping device for a vehicle, wherein when a lever bracket is welded to a clutch cam in the process of assembling the seat pumping device for a vehicle, the lever bracket and a housing are prevented from being compressed to each other and malfunctioning.

Description of the Related Art

A conventional seat pumping device for a vehicle is a device attached to a seat such that a seat occupant adjusts the height of a seat cushion according to the body type of the seat occupant. When the seat occupant manipulates a lever handle mounted to the side of the seat cushion clockwise or counterclockwise, the manipulating force of the lever handle is transmitted to a link device through the seat pumping device so that the seat cushion is raised or lowered in correspondence to the manipulating direction of the lever handle.

Such a seat pumping device for a vehicle is disclosed in Korean Patent Nos. 10-0722849 and 10-0784620.

FIG. 1 is an exploded view illustrating a conventional seat pumping device for a vehicle. Referring to FIG. 1, the seat pumping device for a vehicle may include: a lever bracket 10 provided to be rotated integrally to the lever handle (not shown) manipulated by a user; a return spring guide 11 receiving a return spring 12 which provides an elastic restoring force to the lever bracket 10; a housing 20 having the shape of a drum 22 and provided inside the seat cushion (not shown); a clutch device 30 received into the housing 20 and transmitting a rotation manipulating force of a user input from the lever bracket 10; a brake device 40 blocking torque input in reverse and maintaining the adjusted height of the seat cushion; and a housing cover 50 coupled to a side of the housing 20 to cover the housing 20.

A side surface of the return spring guide 11 may be formed in a donut shape having a concave groove to accommodate the return spring 12.

The clutch device 30 includes a clutch cam 34 received into a clutch drum 32; multiple clutch rollers 36 provided between an outer circumferential surface of the clutch cam 34 and an inner circumferential surface of the clutch drum 32; and a clutch spring 38 elastically supporting the clutch rollers 36.

A plurality of coupling protrusions 35 are provided on a side surface of the clutch cam 34. A through hole 26 is formed in the center of the bottom surface 24 of the drum 22 of the housing 20 such that the coupling protrusions 35 of the clutch cam 34 are inserted into the through hole. The lever bracket 10 includes a coupling drum 4 provided therein, the coupling drum protruding in an axial direction of the lever bracket.

A lever arm 2 formed by bending in the axial direction of the lever bracket 10 is elastically supported in the circumferential direction of the return spring guide 11 by the return spring 12 of the return spring guide 11. When the lever bracket 10 is rotated by the lever handle manipulated by a user, the return spring 12 is compressed by the lever arm 2 of the lever bracket 10, and provides an elastic restoring force to the lever bracket 10.

In addition, a wedge portion 33 is provided in the clutch drum 32, the wedge portion protruding toward the brake device 40. The brake device 40 includes a brake drum 42 having a T-shaped protrusion 43 formed on an outer circumferential surface of the brake drum 42, and multiple brake rollers 44 arranged between the wedge portion 33 and the protrusion 43 in a circumferential direction of the brake device. Accordingly, the brake device 40 can block torque input in reverse and maintain the adjusted height of the seat cushion.

Meanwhile, the coupling protrusions 35 of the clutch cam 34 pass through the through hole 26 of the center of the housing 20, and are inserted into and welded to assembly holes formed in the bottom surface of the coupling drum 4 of the lever bracket 10, so the clutch cam 34 is integrally coupled to the lever bracket 10. However, in the process that the coupling protrusions 35 of the clutch cam 34 are inserted into and welded to the assembly holes of the lever bracket 10, the lever bracket 10, the housing 20, and the clutch cam 34 are compressed to each other, so the lower surface of the lever bracket 10 and the upper surface of the housing 20 are compressed to each other as illustrated in FIG. 2. Accordingly, when the lever bracket 10 is rotated by the manipulation of the lever handle, the lever bracket 10 is rotated while being in excessively close contact with the upper surface of the housing 20, so excessive friction occurs therebetween, and thus the manipulation feeling of the lever handle becomes bad.

The foregoing is intended merely to aid in the understanding of the background of the present invention, and is not intended to mean that the present invention falls within the purview of the related art that is already known to those skilled in the art.

SUMMARY OF THE INVENTION

Accordingly, the present invention has been made keeping in mind the above problems occurring in the related art, and the present invention is intended to propose a seat pumping device for a vehicle, wherein while an insertion portion of a lever bracket and a protrusion of a clutch cam are coupled to each other, the lever bracket is spaced apart by the predetermined distance from an upper end surface of a housing, whereby the manipulation feeling of the lever handle can be improved.

In order to achieve the above objective, according to one aspect of the present invention, there is provided a seat pumping device for a vehicle, a lower end part of which is mounted to a vehicle seat frame, the device including: a housing having inner space provided therein and a slit hole provided in an upper end surface thereof; a clutch cam rotatably received into the inner space of the housing and having protrusions provided thereon, the protrusions protruding toward an outside of the housing and one of the protrusions passing through the slit hole of the upper end surface thereof; and a lever bracket arranged at the outside of the housing to face the upper end surface of the housing, and having an insertion portion into which each of the protrusions of the clutch cam is inserted, so that the lever bracket is coupled to the clutch cam by coupling of the protrusion and the insertion portion to each other, and is rotated with the clutch cam, the lever bracket being spaced apart by a predetermined distance from the upper end surface of the housing while the insertion portion and the protrusion are coupled to each other.

The clutch cam may include a clutch body, and the protrusion may be coupled to the insertion portion of the lever bracket by protruding from a surface of the clutch body toward an upper surface of the housing.

The insertion portion of the lever bracket may be a hole, and may be provided at a position corresponding to the protrusion of the clutch cam.

The hole may include a first hole and a second hole which are different from each other in inner diameters, wherein the inner diameter of the second hole may be larger than the inner diameter of the first hole, and an end of the protrusion may be held by the first hole when the lever bracket is coupled to the clutch cam, so the lever bracket may be spaced apart by the predetermined distance from the upper end surface of the housing.

The inner diameter of the first hole may be configured to be smaller than a diameter of the protrusion, and the inner diameter of the second hole may be configured to be larger than or the same as the diameter of the protrusion.

Each of the protrusions provided on the clutch cam may have the same height and may be configured by being spaced apart from each other in a circumferential direction of the clutch cam.

The protrusions can have a first protrusion having a tapered end, and a second protrusion having non-tapered end.

A size of an inner diameter of the hole may be between a size of a diameter of the tapered end of the first protrusion and a size of the diameter of the second protrusion which is not tapered at the end.

The end of the protrusion and an inner circumferential surface of the hole may be tapered, and a surface of the tapered end of the protrusion may be in surface contact with the tapered inner circumferential surface of the hole while the protrusion is fitted into the hole.

An additional protrusion may be provided on the end of the protrusion by extending therefrom, a diameter of the additional protrusion being smaller than the diameter of the protrusion; the diameter of the additional protrusion may be smaller than a diameter of the hole; and the diameter of the protrusion may be larger than the diameter of the hole.

According to the present invention, while the insertion portion of the lever bracket and the protrusion of the clutch cam are coupled to each other, the lever bracket is spaced apart by the predetermined distance from the upper end surface of the housing, whereby the manipulation feeling of the lever handle can be improved.

BRIEF DESCRIPTION OF THE DRAWINGS

The above and other objects, features, and other advantages of the present invention will be more clearly understood from the following detailed description when taken in conjunction with the accompanying drawings, in which.

DETAILED DESCRIPTION OF THE INVENTION

Hereinbelow, a seat pumping device for a vehicle according to exemplary embodiments of the present invention will be described in detail with reference to the accompanying drawings.

Figure 3:
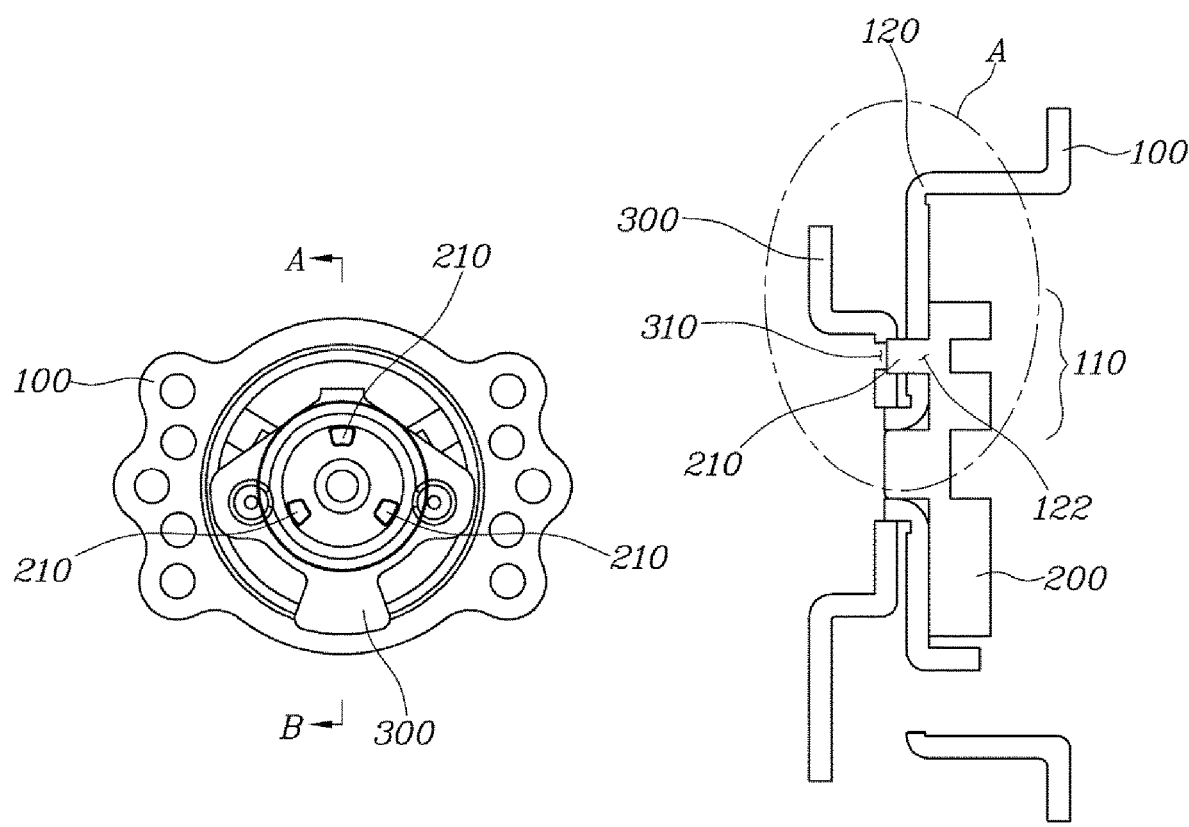
FIG. 3 is a cross-sectional view taken along line A-B after welding a lever bracket and the clutch cam to each other in a seat pumping device for a vehicle according to a first embodiment of the present invention.
Figure 4:
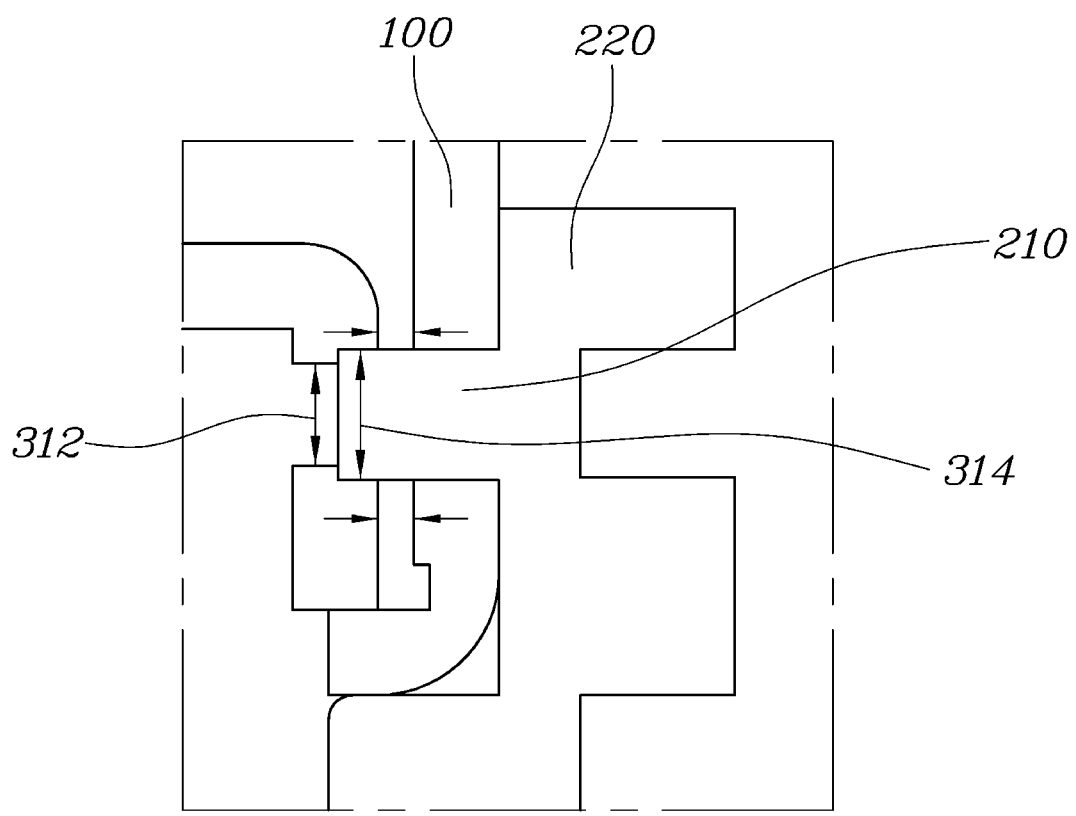
FIG. 4 is an enlarged view of a part A of FIG. 3.
Figure 5:
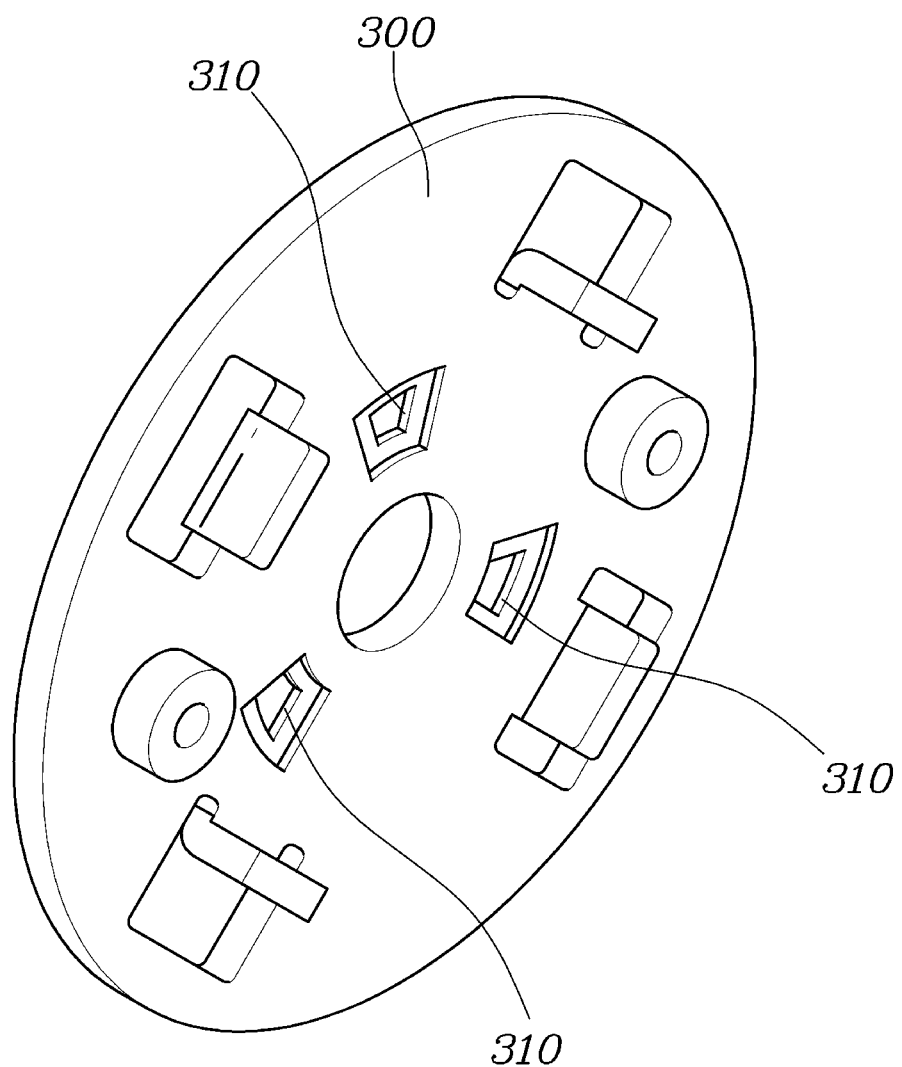
FIG. 5 is a perspective view of the lever bracket according to a second embodiment of the present invention.
Figure 6:
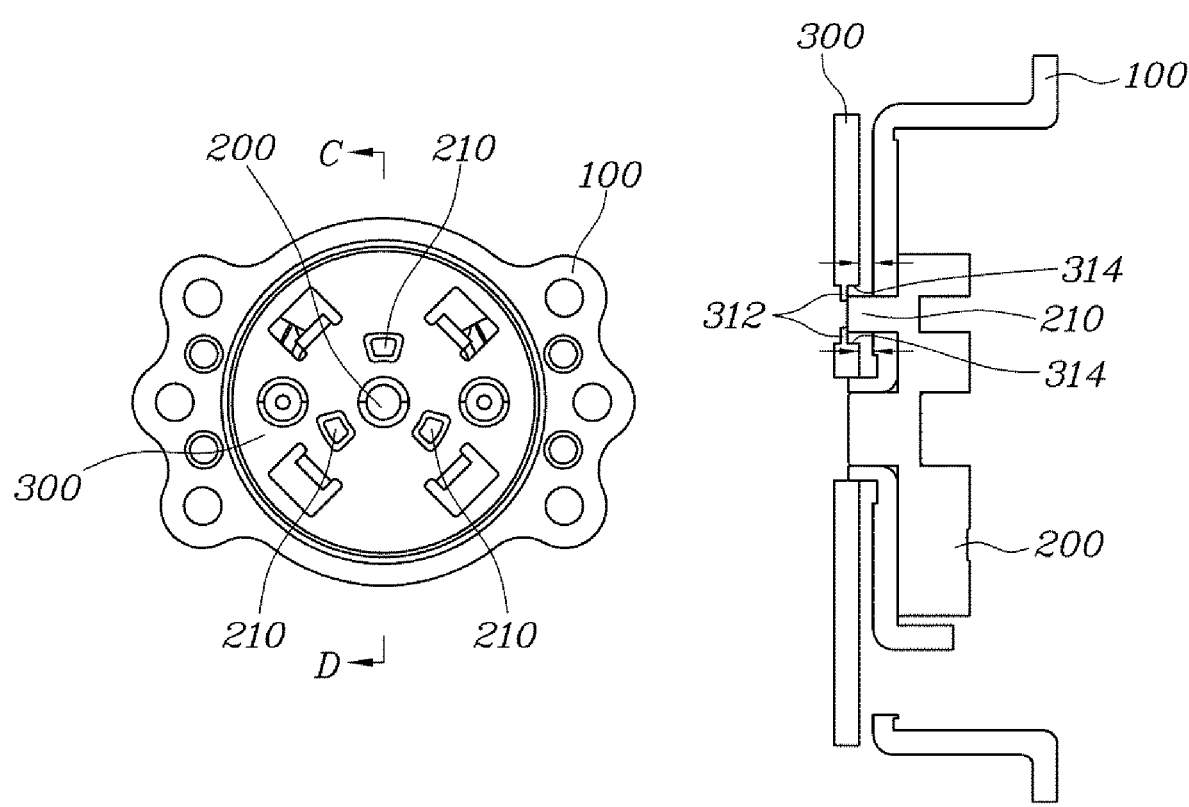
FIG. 6 is a cross-sectional view taken along line C-D after welding the lever bracket and the clutch cam to each other in the seat pumping device for a vehicle according to the second embodiment of the present invention.

FIG. 3 is a cross-sectional view taken along line A-B after welding a lever bracket and the clutch cam to each other in a seat pumping device for a vehicle according to a first embodiment of the present invention; FIG. 4 is an enlarged view of a part A of FIG. 3; FIG. 5 is a perspective view of the lever bracket according to a second embodiment of the present invention; and FIG. 6 is a cross-sectional view taken along line C-D after welding the lever bracket and the clutch cam to each other in the seat pumping device for a vehicle according to the second embodiment of the present invention.

Referring to FIGS. 3 to 6, the seat pumping device for a vehicle according to the embodiment of the present invention may include a housing 100, the clutch cam 200, and the lever bracket 300.

Specifically, the housing 100 is mounted to a vehicle seat frame (not shown) at a lower end part thereof, and may include inner space 110, and a slit hole 122 formed in an upper end surface 120 thereof. Here, the inner space 110 of the housing 100 may be formed in a drum shape. Furthermore, a plurality of slit holes 122 may be formed in the upper end surface 120 by being spaced apart from each other in a circumferential direction of the housing.

The clutch cam 200 includes a clutch body 220, and may be rotatably received into the inner space 110 of the housing 100. Furthermore, the clutch cam 200 may include protrusions 210 provided thereon, the protrusions protruding toward the outside by passing through the slit hole 122 of the upper end surface 120 of the housing 100. Here, the protrusions 210 protrude from a surface of the clutch body 220 toward the upper surface of the housing 100, and may be coupled to an insertion portion 310 of the lever bracket 300.

In addition, each of the protrusions 210 provided on the clutch cam 200 has the same height, and may be configured by being spaced apart from each other in a circumferential direction of the clutch cam 200.

The lever bracket 300 provided outside the housing 100 may be arranged to face the upper end surface of the housing 100. Furthermore, the lever bracket 300 has the insertion portion 310 into which the protrusion 210 of the clutch cam 200 is inserted, and is coupled to the clutch cam 200 by the coupling of the protrusion 210 and the insertion portion 310 to each other so that the lever bracket 300 can rotate together with the clutch cam 200. In addition, the lever bracket 300 may be spaced apart by a predetermined distance from the upper end surface of the housing 100 while the insertion portion 310 is coupled to the protrusion 210 as illustrated in FIGS. 4, and 6 to 9.

Figure 1:
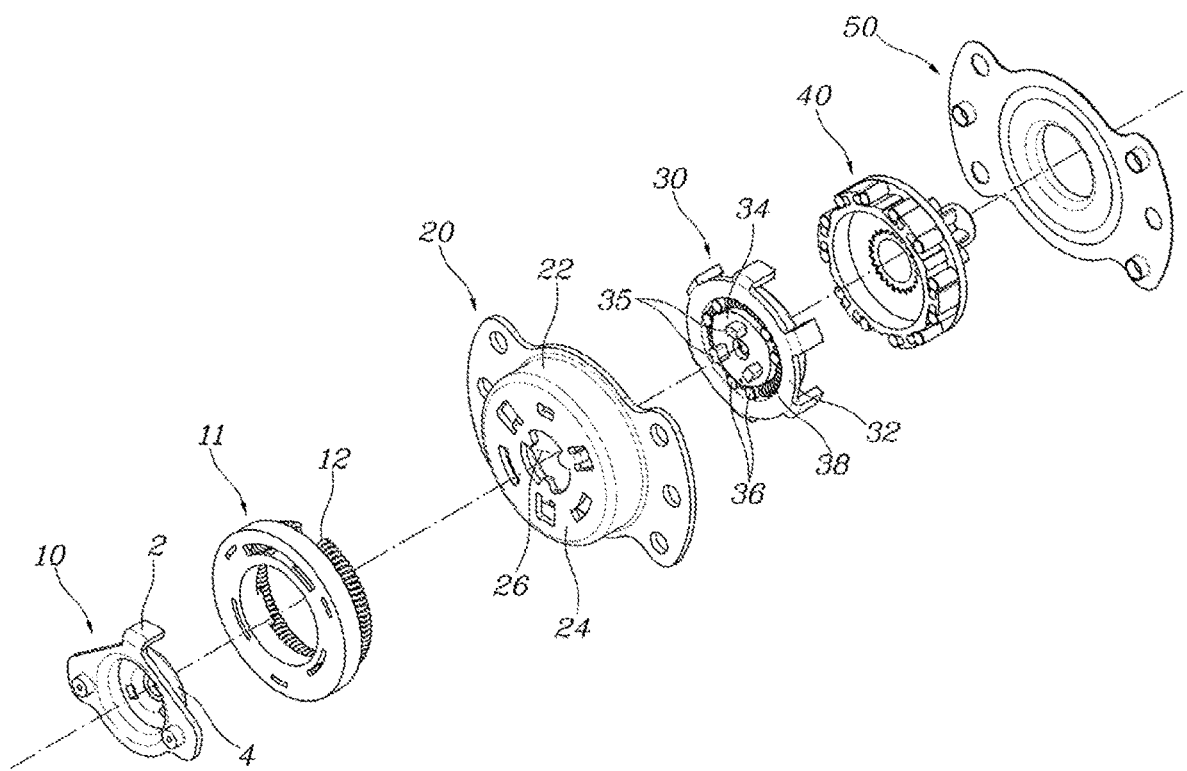
FIG. 1 is an exploded view illustrating a conventional seat pumping device for a vehicle.
Figure 2:
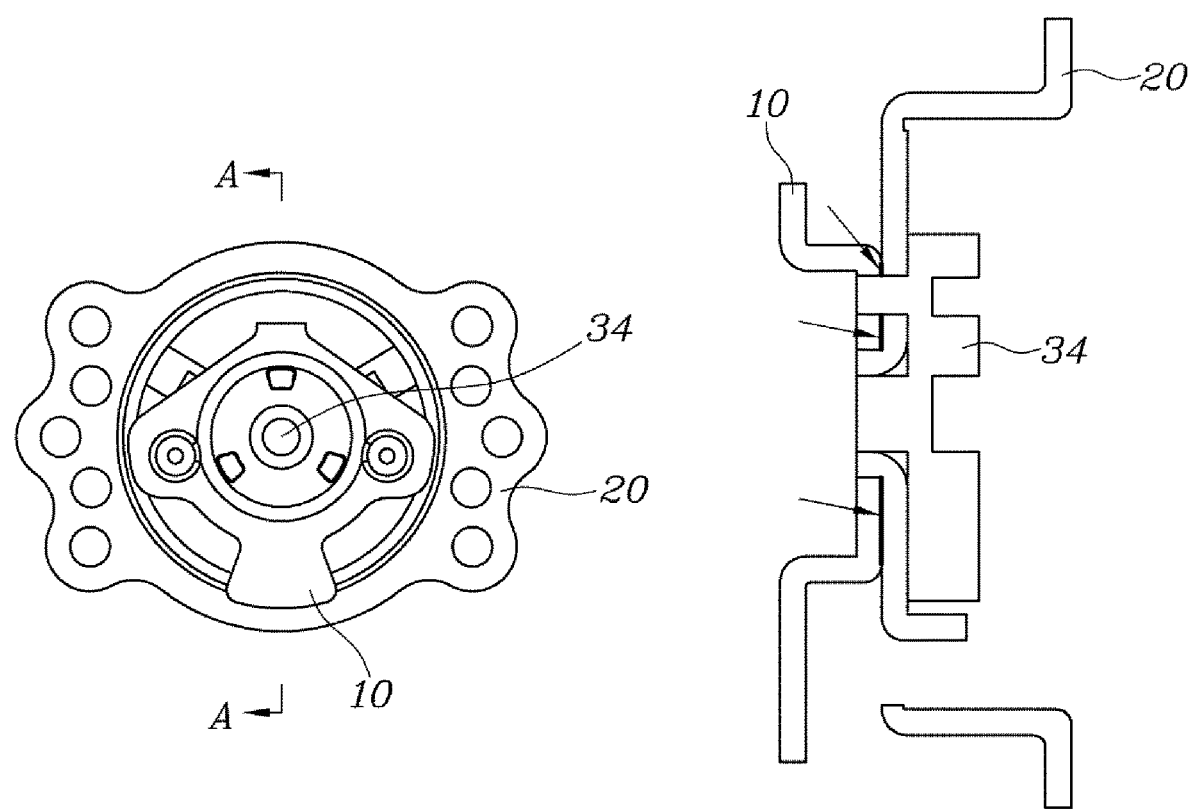
FIG. 2 a view illustrating a lever bracket and a housing compressed to each other in the process of welding the lever bracket to a clutch cam in the conventional seat pumping device for a vehicle.

Meanwhile, as illustrated in FIG. 2, in the prior art, in the process that the coupling protrusions 35 of the clutch cam 34 are inserted into and welded to the assembly holes of the lever bracket 10, the lever bracket 10, the housing 20, and the clutch cam 34 are compressed to each other, so the lower surface of the lever bracket 10 and the upper surface of the housing 20 are compressed to each other. Accordingly, when the lever bracket 10 is rotated by the manipulation of the lever handle, the lever bracket 10 is rotated while being in excessively close contact with the upper surface of the housing 20, so excessive friction occurs therebetween, and thus the manipulation feeling of the lever handle becomes bad.

As described above, in the seat pumping device for a vehicle of the embodiment of the present invention, the lever bracket 300 is spaced apart by the predetermined distance from the upper end surface 120 of the housing 100 while the insertion portion 310 of the lever bracket 300 is coupled to the protrusion 210 of the clutch cam 200, so the manipulation feeling of the lever handle can be improved.

Meanwhile, according to the embodiment, the insertion portion 310 of the lever bracket 300 may be a hole, and in this case, the hole may be formed at a position corresponding to the protrusion 210 of the clutch cam 200.

Specifically, the hole may include a first hole 312 and a second hole 314, which are different from each other in inner diameters. In this case, the inner diameter of the second hole 314 is larger than the inner diameter of the first hole 312. When the lever bracket 300 is coupled to the clutch cam 200, an end of the protrusion 210 is held by the first hole 312, so the lever bracket 300 can be spaced apart by the predetermined distance from the upper end surface of the housing 100.

More specifically, the inner diameter of the first hole 312 may be configured to be smaller than the diameter of the protrusion 210, and the inner diameter of the second hole 314 may be configured to be larger than or the same as the diameter of the protrusion. Accordingly, the inner diameter of the first hole 312 is configured to be smaller than the diameter of the protrusion 210, and the inner diameter of the second hole 314 is configured to be larger than or the same as the diameter of the protrusion, so when the clutch cam 200 and the lever bracket 300 are coupled to each other, the end of the protrusion 210 passes through the second hole 314 and is held by the first hole 312. Accordingly, the lever bracket 300 can be spaced apart by the predetermined distance from the upper end surface 120 of the housing 100, so the manipulation feeling of the lever handle can be improved.

Figure 7:
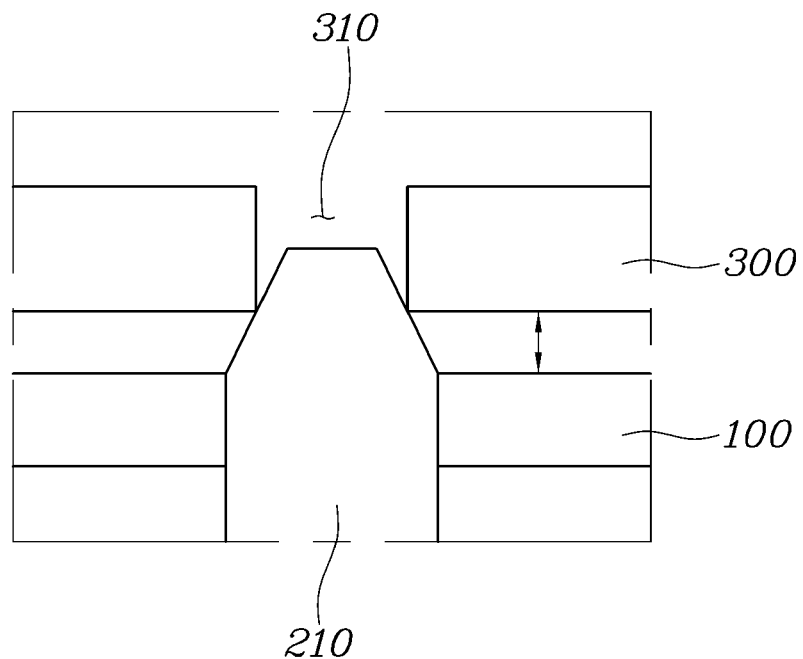
FIG. 7 is a view illustrating the lever bracket spaced apart by a predetermined distance from an upper end surface of the housing while a protrusion of the clutch cam is coupled to an insertion portion in the seat pumping device for a vehicle according to a third embodiment of the present invention.
Figure 8:
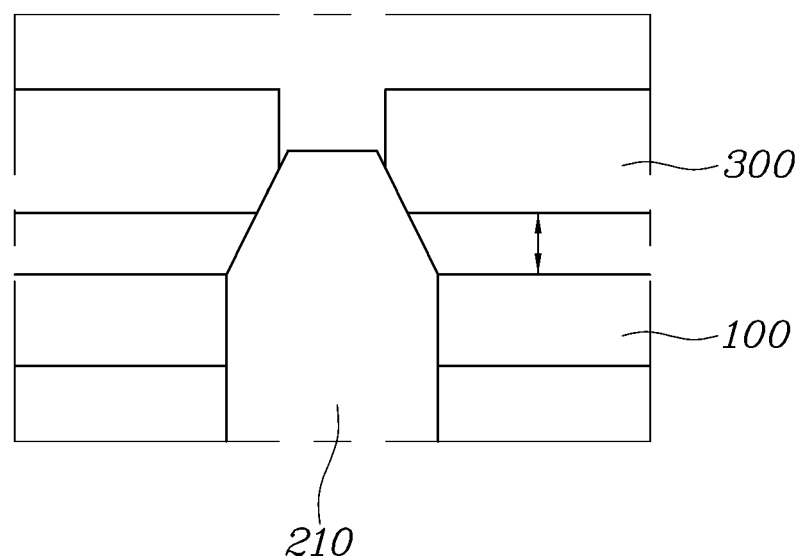
FIG. 8 is a view illustrating the lever bracket spaced apart by a predetermined distance from the upper end surface of the housing while a protrusion of the clutch cam is coupled to an insertion portion in the seat pumping device for a vehicle according to a fourth embodiment of the present invention.
Figure 9:
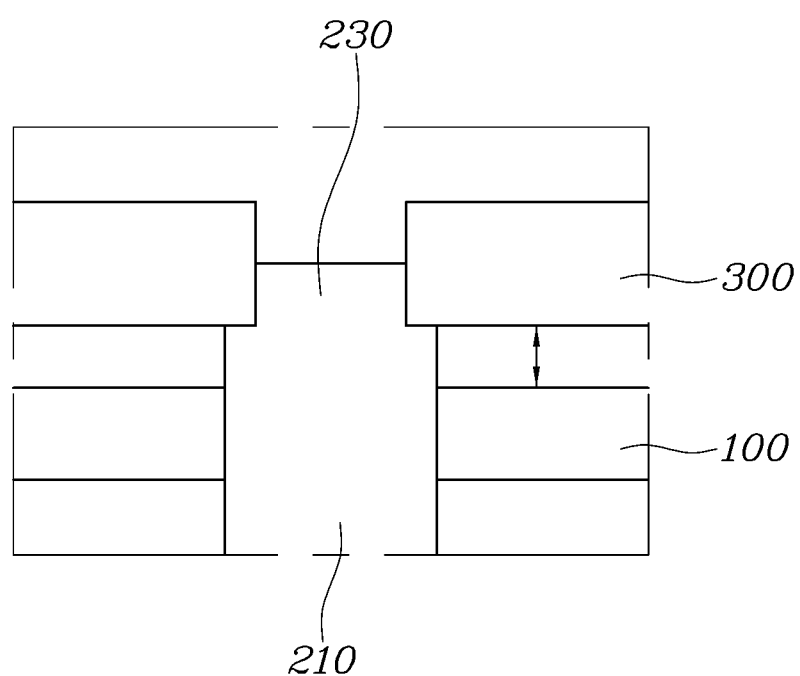
FIG. 9 is a view illustrating the lever bracket spaced apart by a predetermined distance from the upper end surface of the housing while a protrusion of the clutch cam is coupled to an insertion portion of the lever bracket in the seat pumping device for a vehicle according to a fifth embodiment of the present invention.

Meanwhile, FIGS. 7 to 9 are views illustrating the lever bracket spaced apart by the predetermined distance from an upper end surface of the housing while a protrusion of the clutch cam is coupled to the insertion portion of the lever bracket in the seat pumping device for a vehicle according to a third, a fourth, and a fifth embodiments of the present invention, respectively.

Specifically, referring to FIG. 7, the end of the protrusion 210 may be tapered according to the embodiment. In this case, the size of the inner diameter of the hole may be between the size of the diameter of the tapered end of the protrusion 210 and the size of the diameter of the protrusion 210 which is not tapered. That is, the end of the protrusion 210 is tapered, the diameter of the tapered end of the protrusion 210 is smaller than the inner diameter of the hole, and the diameter of the protrusion 210 which is not tapered is tapered to be larger than the inner diameter of the hole. Accordingly, as illustrated in FIG. 7, when the clutch cam 200 and the lever bracket 300 are coupled to each other, the lever bracket 300 can be spaced apart by the predetermined distance from the upper end surface 120 of the housing 100, so the manipulation feeling of the lever handle can be improved.

In addition, referring to FIG. 8, the end of the protrusion 210 and the inner circumferential surface of the hole may be tapered according to the embodiment. Accordingly, since the end of the protrusion 210 and the inner circumferential surface of the hole are tapered, a surface of the tapered end of the protrusion is in surface contact with the tapered inner circumferential surface of the hole while the protrusion 210 is fitted into the hole. As illustrated in FIG. 8, when the clutch cam 200 is coupled to the lever bracket 300, the lever bracket 300 can be spaced apart by the predetermined distance from the upper end surface 120 of the housing 100, whereby the manipulation feeling of the lever handle can be improved.

Furthermore, referring to FIG. 9, according to the embodiment, an additional protrusion 230 may be provided on the protrusion 210 by extending therefrom, a diameter of the additional protrusion being smaller than the diameter of the protrusion 210. In this case, the diameter of the additional protrusion 230 may be configured to be smaller than the diameter of the hole, and the diameter of the protrusion 210 may be configured to be larger than the diameter of the hole. Accordingly, the additional protrusion 230 having the diameter smaller than the diameter of the hole is provided on the upper end surface of the protrusion 210 by extending therefrom, and the diameter of the protrusion 210 is configured to be larger than the diameter of the hole. Accordingly, as illustrated in FIG. 9, when the clutch cam 200 and the lever bracket 300 are coupled to each other, the lever bracket 300 can be spaced apart by the predetermined distance from the upper end surface 120 of the housing 100, whereby the manipulation feeling of the lever handle can be improved.

What is claimed is:

1. A seat pumping device for a vehicle, the device comprising:
  a housing having an inner space defined therein and at least one slit hole disposed in an upper end surface thereof;
  a clutch cam disposed in the inner space of the housing and having at least one protrusion disposed thereon, the at least one protrusion protruding toward an outside of the housing by passing through the at least one slit hole of the upper end surface thereof; and a lever bracket arranged at the outside of the housing to face the upper end surface of the housing, and having at least one insertion portion into which the at least one protrusion of the clutch cam is inserted, so that the lever bracket is coupled to the clutch cam by coupling of the at least one protrusion and the at least one insertion portion to each other, and is rotatable with the clutch cam, wherein the lever bracket is spaced apart by a predetermined distance from the upper end surface of the housing while the at least one insertion portion and the at least one protrusion are coupled to each other, wherein the at least one insertion portion of the lever bracket is at least one hole, and is disposed at a position corresponding to that of the at least one protrusion of the clutch cam, wherein the at least one hole comprises a first hole and a second hole which are different from each other in inner diameters, and wherein the inner diameter of the second hole is larger than the inner diameter of the first hole, and an end of the at least one protrusion is held by the first hole when the lever bracket is coupled to the clutch cam, such that the lever bracket is spaced apart by the predetermined distance from the upper end surface of the housing.

2. The device of claim 1, wherein the clutch cam comprises a clutch body, and the at least one protrusion is protruding from a surface of the clutch body toward the upper end surface of the housing.

3. The device of claim 1, wherein the inner diameter of the first hole is configured to be smaller than a diameter of the at least one protrusion, and the inner diameter of the second hole is configured to be larger than or the same as the diameter of the at least one protrusion.

4. The device of claim 1, wherein each of the at least one protrusion disposed on the clutch cam has the same height, and the at least one protrusion is spaced apart from each other in a circumferential direction of the clutch cam.

5. A seat pumping device for a vehicle, the device comprising:
a housing having an inner space defined therein and at least one slit hole disposed in an upper end surface thereof;
a clutch cam disposed in the inner space of the housing and having at least one protrusion disposed thereon, the at least one protrusion protruding toward an outside of the housing by passing through the at least one slit hole of the upper end surface thereof; and
a lever bracket arranged at the outside of the housing to face the upper end surface of the housing, and having at least one insertion portion into which the at least one protrusion of the clutch cam is inserted, so that the lever bracket is coupled to the clutch cam by coupling of the at least one protrusion and the at least one insertion portion to each other, and is rotatable with the clutch cam,
wherein the lever bracket is spaced apart by a predetermined distance from the upper end surface of the housing while the at least one insertion portion and the at least one protrusion are coupled to each other,
wherein the at least one insertion portion of the lever bracket is at least one hole, and is disposed at a position corresponding to that of the at least one protrusion of the clutch cam, and
wherein the at least one protrusion has a first protrusion and a second protrusion, and wherein the first protrusion has a tapered end and the second protrusion has a non-tapered end.

6. The device of claim 5, wherein a size of an inner diameter of the at least one hole is between a size of the diameter of the tapered end of the first protrusion and a size of the diameter of the non-tapered end of the second protrusion.

7. A seat pumping device for a vehicle, the device comprising:
a housing having an inner space defined therein and at least one slit hole disposed in an upper end surface thereof;
a clutch cam disposed in the inner space of the housing and having at least one protrusion disposed thereon, the at least one protrusion protruding toward an outside of the housing by passing through the at least one slit hole of the upper end surface thereof; and
a lever bracket arranged at the outside of the housing to face the upper end surface of the housing, and having at least one insertion portion into which the at least one protrusion of the clutch cam is inserted, so that the lever bracket is coupled to the clutch cam by coupling of the at least one protrusion and the at least one insertion portion to each other, and is rotatable with the clutch cam,
wherein the lever bracket is spaced apart by a predetermined distance from the upper end surface of the housing while the at least one insertion portion and the at least one protrusion are coupled to each other,
wherein the at least one insertion portion of the lever bracket is at least one hole, and is disposed at a position corresponding to that of the at least one protrusion of the clutch cam, and
wherein an end of the at least one protrusion and an inner circumferential surface of the at least one hole are tapered, and a surface of the tapered end of the at least one protrusion is in surface contact with the tapered inner circumferential surface of the at least one hole while the at least one protrusion is fitted into the at least one hole.

8. The device of claim 1, wherein one of the at least one protrusion has an additional protrusion extending from an end thereof, and
wherein a diameter of the additional protrusion is smaller than a diameter of the one of the at least one protrusion, is smaller than a diameter of the at least one hole, and the diameter of the one of the at least one protrusion is larger than the diameter of the at least one hole.

\* \* \* \* \*